SINGLE SIDEBAND COMMUNICATION SYSTEM

Filed Sept. 9, 1960 3 Sheets-Sheet 1

INVENTORS.
WILLIAM SICHAK
ZENO LYON
BY Alfred C. Hill
AGENT

INVENTORS.
WILLIAM SICHAK
ZENO LYON
BY
Alfred C. Hill
AGENT

SINGLE SIDEBAND COMMUNICATION SYSTEM

Filed Sept. 9, 1960

INVENTORS.
WILLIAM SICHAK
ZENO LYON
BY
Alfred C. Hill
AGENT

United States Patent Office 3,201,692
Patented Aug. 17, 1965

3,201,692
SINGLE SIDEBAND COMMUNICATION SYSTEM

William Sichak, Nutley, and Zeno G. Lyon, Plainfield, N.J., assignors to International Telephone and Telegraph Corporation, Nutley, N.J., a corporation of Maryland

Filed Sept. 9, 1960, Ser. No. 55,034
20 Claims. (Cl. 325—17)

Figure 1:
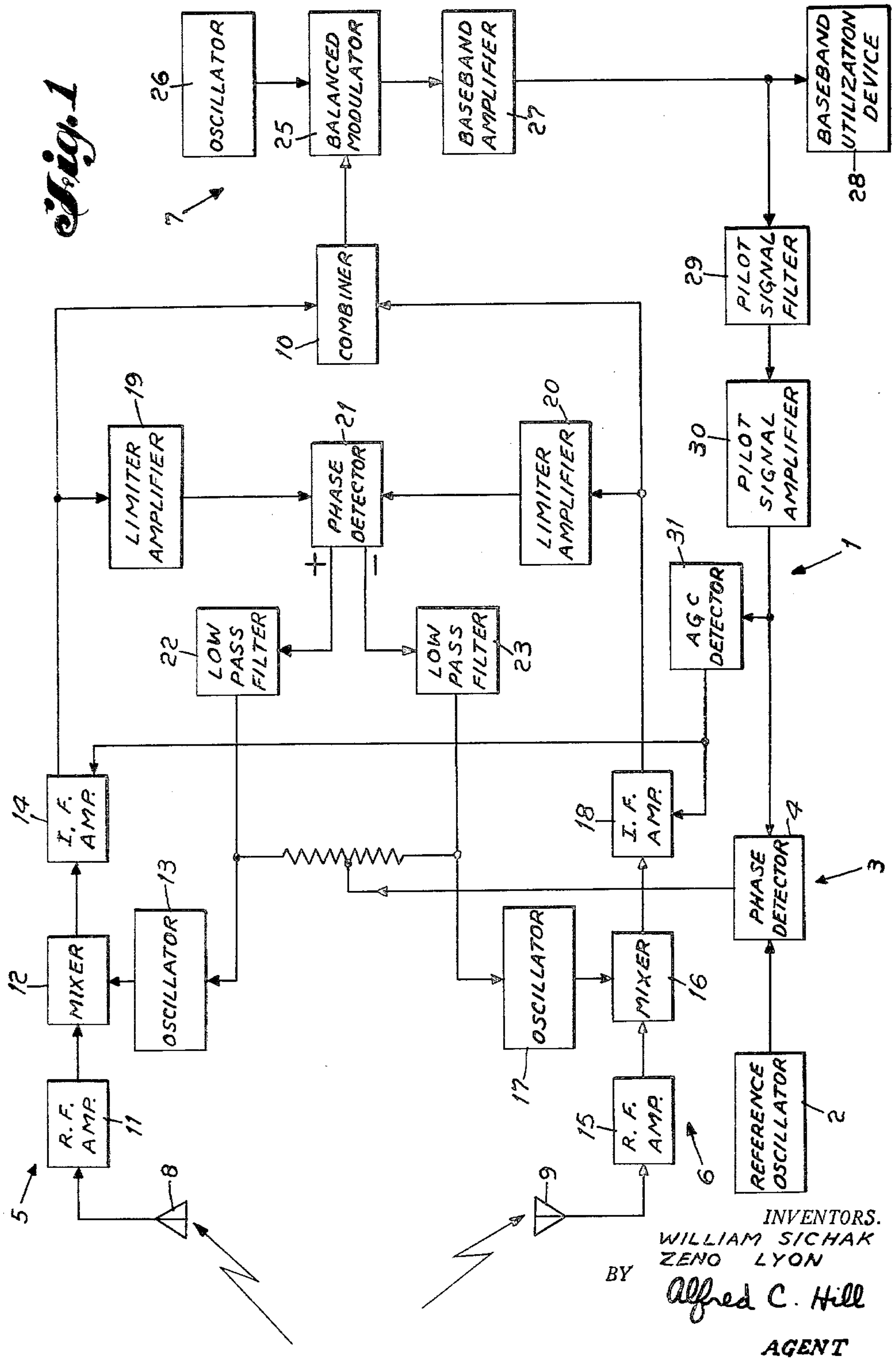

This invention relates to communication systems and more particularly to an improved single sideband suppressed carrier communication system which may be adapted advantageously for utilization in forward scatter communication systems.

In the early days of ultra-high frequency (UHF) long range system developments, frequency modulation (FM) techniques were employed due to the apparent advantages of signal-to-noise enhancement and the convenience of the systems already being established which could be quickly and easily adapted for UHF long range communication. Thus, in the advent of tropospheric scatter systems, FM techniques were utilized primarily to provide the desired scatter propagation in communication. Diversity techniques were utilized with the forward scatter systems to minimize the fading that takes place in such a system. Diversity techniques that have been developed for incorporation in an FM system were therefore important and the development proved that the technique affording the best near-threshold performance in an FM scatter system is a diversity combining arrangement that has become known by various names, such as, equal gain, phase or intermediate frequency (IF) combiner.

With emphasis being placed on single sideband transmission, it has been discovered that single sideband systems have certain advantages over the FM systems as follows: (1) spectrum conservation; (2) superior performance against multipath fading; and (3) less power required for a given channel signal-to-noise ratio.

UHF single sideband systems useful in tropospheric radio systems are not completely without problems. In the development of such a system, there were problems encountered in the frequency conversion of the audio signals to the UHF frequency range; efficient generation of high power UHF single sideband signals with a minimum of distortion and transmission and reception of the single sideband signals through a medium having frequency selective fading and Doppler frequency shifts.

One previous UHF single sideband receiver employed a radio frequency (RF) portion to reduce the received signal to a subcarrier frequency range and a preselector filter which rejected the receiver image frequency and any nearby or associated transmitter frequency. A crystal mixer converts the received signal to the intermediate frequency (IF) signal by mixing with the local oscillator signal originating from a local oscillator and frequency multiplier. A low noise preamplifier delivers the IF signals to the IF amplifier which has a wide dynamic range, high speed, automatic gain control (AGC) circuit. Image frequency rejection for the single sideband demodulator is achieved in a sideband filter. The signal is further amplified and fed to the single sideband demodulator along with the output from the second of a cascade pair of pilot extraction crystal filters. This output signal is a clean signal equivalent to the pilot signal frequency which is equal to the IF signal. The original baseband signals are recovered and amplified for utilization. If the single sideband receiver were used in a diversity receiving arrangement, the baseband signals after being recovered and amplified would be combined with the baseband signals from other single sideband receivers. The pilot signal filters and phase discriminator produce an automatic frequency control (AFC) signal that corrects the receiver local oscillator frequency to keep the pilot centered within the pilot signal filters. The output signal of the first pilot signal filter is amplified and detected to provide an AGC voltage for controlling the gain of the IF amplifiers.

In this prior art UHF single sideband receiver, the necessary AFC and combining schemes are rather complex, especially if it is attempted to make them fail safe. A more important consideration and disadvantage of the prior art system is the vulnerability to multipath effects. Selective fading makes it difficult to derive a proper control voltage for the combiner and, further, the combiner distorts when the signals are presented at different levels by different receiving channels. The AFC is needed to insure inphase combining in the prior art arrangement. The crystal filter for pilot signal extraction requires a precision of at least 0.001 percent, the amplifier requires relatively high-drain tubes, and the motor for AFC control is required to be geared down so that manual initial positioning is required. The baseband combiner control method employed in the prior art UHF single sideband receivers for diversity advantage involves special circuitry to obtain the correct ratio squared characteristic from the logarithmic AGC voltage. The gain correcting control means involves a high gain noise amplifier in an auxiliary loop which can be made fail safe only by addition of pilot and squelch features. If an IF amplifier should fail, the noise decreases, calling for more gain, and the gain correcting control means makes the combiner grid and cathode voltages more positive so as to prevent proper utilization of the still good channels. If an RF mixer crystal should fail, the AGC would cause a noise surge until the slow gain correcting control means operated. In the case of selective fading due to multipath propagation, a serious weakness of this type of combiner becomes apparent. It has been shown that signals of about the same level must be provided at all combiner grids to avoid distortion. This is manifestly difficult to accomplish if the frequency spectra are irregular and different. Still more so, if the control voltage representing the total signal is derived entirely from a pilot signal at one end of the signal band. Clearly, pilot signal amplitudes in all channels may be equal and yet different peak amplitudes impressed on the combiner grids. Slope equalizers will obviously overcome this serious difficulty, but even if an operational design is achieved, simplified and made fail safe, it still cannot handle severe spectrum irregularities, inband cancellation nulls in particular.

A second prior art UHF single sideband receiving system proposed to eliminate or minimize the difficulties of the above-mentioned UHF single sideband receiving system includes a source of reference signal having a frequency substantially equal to the frequency of the pilot signal and an arrangement responsive to the pilot signal and the reference signal to lock the reference signal in a predetermined phase relationship with respect to the pilot signal. In other words, the reference oscillator is frequency controlled by a phase locking loop to lock the frequency of the signal from the reference oscillator to the frequency of the pilot signal. The demodulator for this single sideband receiver is responsive to the received signal and the phase controlled reference signal to produce at the output of the demodulator the sideband signal of the received signal. To overcome the difficulty of the combining arrangement in the first prior art system, the second prior art system utilized for diversity operation equal gain combining techniques of FM systems whereby the single sideband signals having random phase relationships relative to each other were phase compared one with the other to produce a control signal to adjust the phase relationship therebetween to enable inphase combining at the intermediate frequency level prior to reference oscillator frequency stabilization and single sideband demodulation.

An object of this invention is to provide still another single sideband suppressed carrier receiver for operation in the UHF frequency range overcoming the disadvantages of the first prior art receiving system described hereinabove.

Another object of this invention is to provide a UHF single sideband receiving system of the suppressed carrier type operable in a diversity receiving system enabling the employment of the equal gain combining techniques of FM diversity systems.

Still another object of this invention is to provide a transceiver arrangement including the improved UHF single sideband receiving system of this invention and a single sideband suppressed carrier transmitting system disposed in a cooperative relationship to enable the employment of certain circuit components in common.

A feature of this invention is the provision of a single sideband suppressed carrier receiver comprising a source of signals including a single sideband suppressed carrier signal and a pilot signal having a frequency related to the frequency of the suppressed carrier, a source of reference signal having a frequency substantially equal to the frequency of the pilot signal, means responsive to the pilot signal and the reference signal to produce a control signal proportional to the frequency drift of the single sideband signal with respect to the reference signal, and means disposed in the source of signals responsive to the control signal to compensate the frequency drift for substantially distortionless demodulation of the single sideband signal. The single sideband suppressed carrier demodulation will take place in a demodulation circuit which employs an oscillatory signal for mixing with the signal to be demodulated other than the reference signal.

Another feature of this invention is the provision of a heterodyne receiver and single sideband suppressed carrier demodulator as the signal source of the improved single sideband suppressed carrier receiver of this invention. The heterodyne receiver includes at least a mixer and local oscillator to provide intermediate frequency signals at the output of the mixer. The demodulator for the single sideband signal includes a balanced modulator and oscillator. The frequency control signal produced by comparing the pilot signal and reference signal may be coupled to either the local oscillator or the demodulator oscillator or both of these oscillators to provide the desired frequency drift compensation.

Still another feature of this invention is the provision of a plurality of signal channels to receive single sideband suppressed carrier diversity signals and a common single sideband suppressed carrier demodulator as the signal source of the single sideband suppressed carrier receiver of this invention. Each of the signal channels includes a mixer and local oscillator to provide intermediate frequency signals in the signal channels prior to combining thereof to provide one single sideband suppressed carrier signal for coupling to the demodulator including a balanced modulator and oscillator to recover the intelligence contained in the one single sideband signal. The frequency control signal produced by comparison of the pilot signal and reference signal is coupled to at least one of the oscillators of the signal channels and/or both oscillators of the demodulator to provide the desired frequency drift compensation.

A further feature of this invention is the provision of a phase comparing arrangement cooperating with the above-described diversity receiving arrangement to maintain the channel signals in a predetermined phase relationship with respect to each other to enable inphase combining in a signal combiner. The phase control signals for the phase adjustment may be coupled to at least one of the oscillators of the signal channels or differentially coupled to each of the oscillators of the signal channels.

With this latter arrangement the frequency control signal for demodulation purposes may be coupled to the same oscillators as the phase control signal.

Still a further feature of this invention is the provision of a gain control arrangement operating in response to the pilot signal to control the gain of the signal in the above-mentioned heterodyne receiver and to control the signal channels to have equal gain in the above-mentioned diversity system.

Still another feature of this invention is the incorporation in a transceiver arrangement of the single sideband suppressed carrier receiver of this invention which employs in common with a single sideband suppressed carrier of the transceiver arrangement a UHF frequency translator in the form of a balanced modulator and oscillator combination to translate the received UHF signals to a lower frequency range and the signals to be transmitted to the UHF frequency range. The frequency control signal of the receiver is coupled to the oscillator of this common frequency translator.

Figure 2:
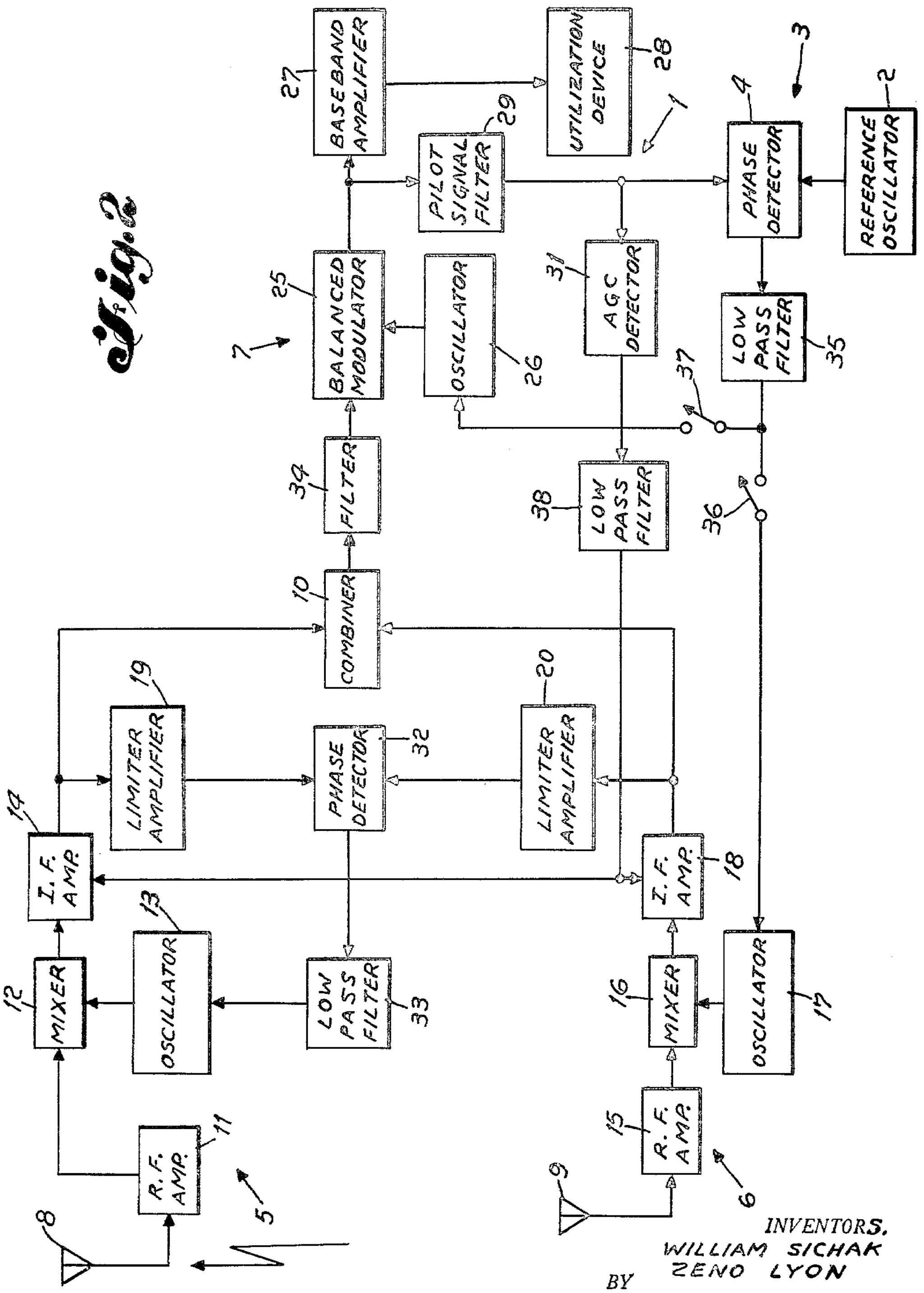
Figure 3:
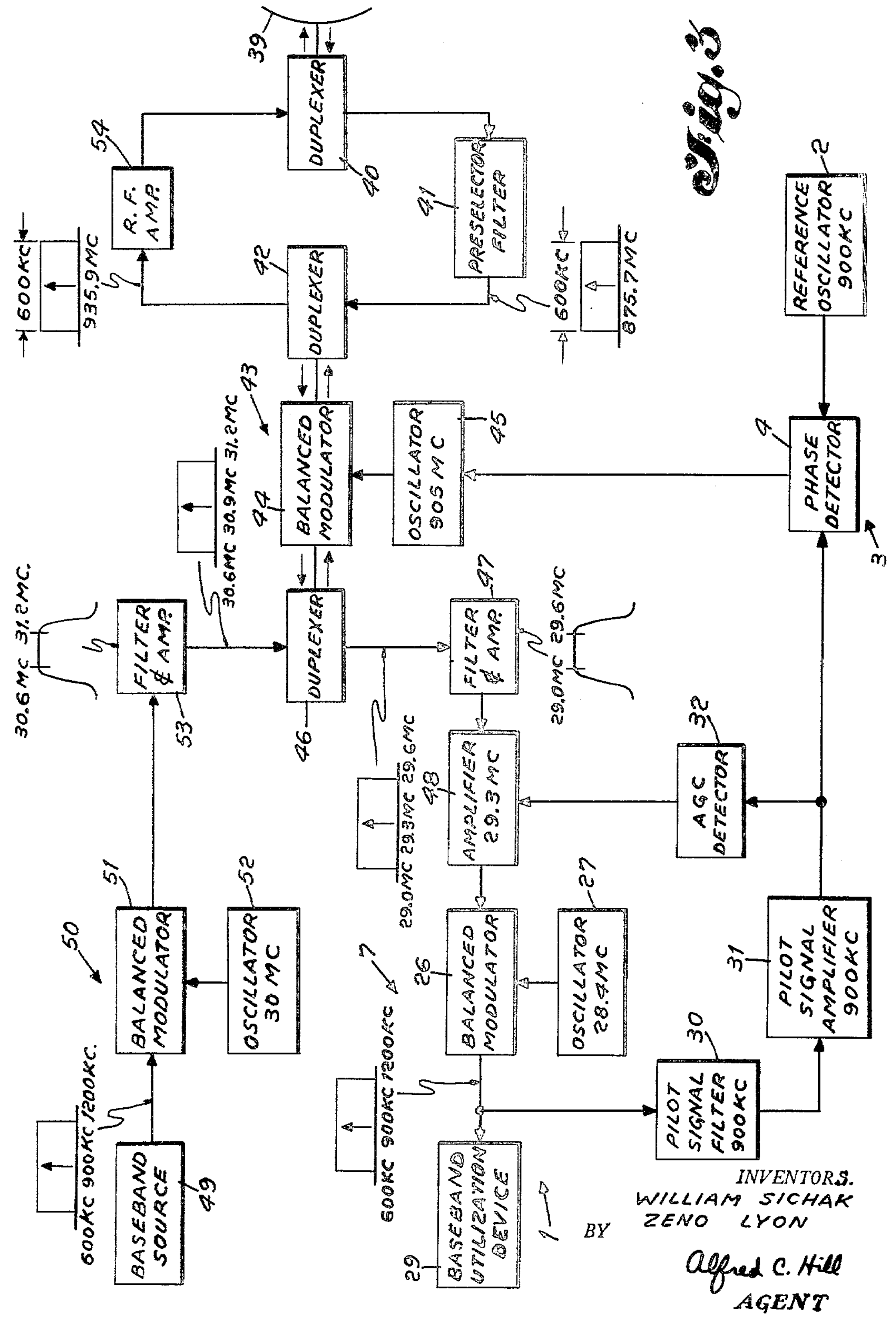

The above-mentioned and other features and objects of this invention will become more apparent by reference to the following description taken in conjunction with the accompanying drawings, in which:

FIG. 1 is a schematic diagram in block form of a diversity receiving arrangement incorporating an embodiment of a single sideband suppressed carrier receiver following the principles of this invention;

FIG. 2 is a schematic diagram in block form of another diversity receiving arrangement incorporating another embodiment of the single sideband receiver of this invention; and FIG. 3 is a schematic diagram in block diagram form of a transceiver arrangement including a single sideband suppressed carrier receiver following the principles of this invention and a single sideband suppressed carrier transmitter cooperatively coupled to employ certain components in common.

Referring to FIG. 1, the single sideband suppressed carrier receiver following the principles of this invention is illustrated as including generically a source of signals including a single sideband suppressed carrier signal and a pilot signal having a frequency related to the frequency of the suppressed carrier, indicated generically as source 1, and a source of reference signals illustrated as reference oscillator 2 having a frequency substantially equal to the pilot signal. The signals from source 1 and oscillator 2 are coupled to means 3, in the form of a phase detector 4, responsive to the pilot signal and reference signal to produce a control signal proportional to the frequency drift of the single sideband signal with respect to the signal of reference oscillator 2, or in other words, the reference signal. The control signal at the output of phase detector 4 is coupled to source 1 which includes therein a means responsive to the control signal to compensate the frequency drift of the single sideband signal for substantially distortionless demodulation of the single sideband signal.

More specifically, source 1 is illustrated in FIG. 1 as including a dual diversity receiving arrangement including signal channels 5 and 6 and single sideband suppressed carrier demodulator 7. Single sideband signals produced in any of a number of different ways known to those skilled in the art in a distant transmitter terminal are received on antennas 8 and 9. The signals received on these antennas are sufficiently uncorrelated to achieve diversity advantage by any of a number of known techniques, such as by frequency, space, time or angle diversity techniques. Each of signal channels 5 and 6 is illustrated as including substantially the same equipment operating to produce at the output of the signal channels identical signals disposed in a predetermined phase relation with respect to each other for inphase combining in a combining means illustrated as combiner 10. Signal channel 5 includes a radio frequency amplifier 11, a heterodyning arrangement including mixer 12 and oscillator 13 and an IF amplifier 14. Signal channel 6 includes an RF amplifier 15 and a heterodyning arrangement including mixer 16 and oscillator 17 and an IF amplifier 18. To maintain the signals in signal channels 5 and 6 in a predetermined phase relationship for inphase combining in combiner 10, the outputs of channels 5 and 6, namely, the outputs of amplifiers 14 and 18, are coupled through limiter amplifiers 19 and 20, respectively, to a phase detector 21. In phase detector 21, the signals on signal channels 5 and 6 are compared in phase and a control signal produced proportional to the phase relationship between the signals. The output of phase detector 21 is a balanced direct current (D.C.) output applied to low pass filters 22 and 23 to prevent other than the control signal from being applied to the control points, namely, oscillators 13 and 17. The balanced outputs of phase detector 21 are coupled to oscillators 13 and 17 for differential application thereto to adjust the frequency of oscillators 13 and 17 with respect to one another to provide the predetermined phase relationship between the input signals for inphase combining in combiner 10.

Thus, source 1 utilizes an extension of techniques employed in FM dual diversity receivers. The major diffetrence between the FM dual diversity receiver and the single sideband dual diversity receiver is that the received signal level is constant, negleting fading, in an FM system whereas in the single sideband system, the received signal level varies with the modulation. The phase detector used with the frequency modulation receivers produces control voltages sufficient for phase lock during 20 db fades with IF amplifier output levels of 9 dbm. The limiter amplifiers 19 and 20 are incorporated in the single sideband dual diversity receiver to provide approximately 15 db gain at pilot tone and limiting 15 db below peak level to permit phase control of oscillators 14 and 17 and hence phase control for the signals being combined in combiner 10 to equal that in the present FM dual diversity receivers.

The single output of combiner 10, combining the best of both signals received on channels 5 and 6, are applied to single sideband demodulator 7 including balanced modulator 25 and oscillator 26 cooperating to produce at the output of balanced modulator 25 the single sideband signal, or in other words, the intelligence signal in the baseband region and the pilot signal related to the received pilot signal. The demodulated output signal is applied to baseband amplifier 27 for application for the baseband utilization device 28.

To utilize the pilot signal in the single sideband suppressed carrier receiver of this invention, pilot signal filter 29 is coupled to source 1, the ouput of baseband amplifier 27, to extract the demodulated version of the pilot signal. The extracted demodulated pilot signal is then amplified in amplifier 30 prior to application to the phase detector 4. As pointed out hereinabove, phase detector 4 compares the demodulated pilot signal with the signal from reference oscillator 2 producing a D.C. control signal which is applied to a portion of source 1, this portion or components of source 1 in the embodiment of FIG. 1 being oscillators 13 and 17.

Thus, as illustrated in FIG. 1, the control signal at the output of phase detector 4 is coupled in the same sense to both oscillators 13 and 17 to control the absolute frequency of these oscillators to provide correct frequency for the signal applied to demodulator 7 for substantially distortionless demodulation of the single sideband suppressed carrier signal.

In summary, in the embodiment illustrated in FIG. 1 wherein the single sideband suppressed carrier receiver has a signal source in the form of a dual diversity combining receiver arrangement, the relative phase of the local oscillators 13 and 17 are controlled to provide a predetermined phase relationship between the two received signals for inphase combining at IF level in combiner 10. Simultaneously the absolute frequency of oscillators 13 and 17 are controlled to provide correct signal frequency at the input of the single sideband or synchronous demodulator 7. These two controls on oscillators 13 and 17 are accomplished by superimposing the two control loops illustrated in FIG. 1. The control signals are added in series providing simultaneous control of relative signal phase in channels 5 and 6 and the final signal frequency.

To facilitate the combining of the signals on channels 5 and 6, it is preferred that the gain in the channels be maintained equal. This is accomplished by utilizing AGC detector 31 coupled to the output of amplifier 30 responsive to the amplitude of the demodulated pilot signal to produce a gain control signal which is proportional to the amplitude of the pilot signal. The gain control signal is coupled to IF amplifiers 14 and 18 to equally control the gain of signal channels 5 and 6. Thus, working together are three control signals necessary to provide the desired combining of the diversity signals and demodulation of the single sideband suppressed carrier signal to recover intelligence, namely, an APC control signal and an AGC control signal cooperating in the diversity combining system and an AFC control signal cooperating in the demodulation of the single sideband signal.

It is, of course, recognized that the AGC control can be applied to a single heterodyne receiver to adjust the amplitude of the signal being applied to the demodulator and of course it is not restricted to utilization in just a diversity receiving arrangement.

Although the description hereinabove with reference to the single sideband suppressed carrier receiver illustrated in FIG. 1 has been directed to a source of signals provided by a dual diversity IF combining arrangement, it is to be understood that the single sideband suppressed carrier receiver can have as its source of signals the heterodyning receiving arrangement, such as might be illustrated by one of the signal channels, such as signal channel 5, without, of course, the phase control arrangement necessary in the dual diversity combining scheme. Thus in a signal receiving arrangement wherein the source of single sideband and pilot signals are provided by a heterodyne receiver, the frequency control would be merely coupled to either oscillator 13 or oscillator 26 and is depicted in FIG. 1 as being coupled to oscillator 13.

Referring to FIG. 2, there are illustrated therein certain variations of the automatic phase control loop and the automatic frequency loop of the single sideband suppressed carrier receiver of this invention. In the description of the arrangement illustrated in FIG. 2, like reference characters will be applied to those components that are substantially the same as the components in the arrangement of FIG. 1. As in FIG. 1, the source is composed of a dual diversity IF combining arrangement including signal channels 5 and 6 responding to single sideband signals plus a pilot signal transmitted by means of a distant transmitter terminal to antennas 8 and 9. The output of the signal channels 5 and 6 are coupled to combiner 10 with these output signals also being coupled through limiter amplifiers 19 and 20 to a phase detector 32 to produce a phase control signal to adjust the relative phase relationship between the signals on channels 5 and 6 for inphase combining in combiner 10. In the illustration of FIG. 2, phase detector 32, unlike phase detector 21, produces only a single control signal which is coupled through low pass filter 33 to only one of the oscillators included in the diversity combining arrangement. As illustrated, the output of low pass filter 33 having all but the control voltage removed by the action of filter 33 is coupled to oscillator 13 to adjust the signal of channel 5 with respect to the signal 6 to place the output signals of these two channels in a predetermined phase relationship for inphase combining in combiner 10. With this modification, the combining arrangement operates substantially as described hereinabove with respect to FIG. 1.

The output of combiner 10, a single signal incorporating the best characteristics of the two signals in channels 5 and 6, are passed through filter 34 to remove unwanted frequency components for application to synchronous demodulator 7 including as in FIG. 1 balanced modulator 25 and oscillator 26. The demodulated output of modulator 25 is coupled to basehand amplifier 27 and hence to utilization device 28. The output of modulator 25 is likewise coupled to pilot signal filter 29 which extracts the demodulated pilot signal from the demodulator output signal. The output of filter 29 is coupled to phase detector 4 which is responsive to the pilot signal and the reference signal of oscillator 2 to produce a frequency control signal which is utilized to compensate any frequency drift that may take place in the single sideband signal through frequency error in the oscillators or other distortion present in the path through which the single sideband signal has passed. The control signal at the output of detector 4 is passed through a low pass filter 35 to remove any variations thereof and leave only the D.-C. control signal. The compensation for frequency drift may be accomplished in one of two ways as illustrated in FIG. 2 by appropriately positioning switches 36 and 37 to their closed position. For instance, if switch 36 is closed, the output of the phase detector 4 would be coupled to oscillator 17 to adjust the absolute frequency of oscillator 17. This frequency control in conjunction with the operation of phase detector 32 would cause oscillator 13 to change frequency for proper combining in combiner 10 thereby providing the proper frequency for the signal coupled to the input of balanced modulator 25 for substantially distortionless demodulation of the single sideband signal. On the other hand, if switch 36 is left open, and switch 37 is closed, the control signal from detector 4 would be coupled to oscillator 26 to adjust the frequency of this oscillator to compensate the frequency drift of the single sideband signal and permit substantially distortionless demodulation of the single sideband signal. In this latter arrangement, there is no attempt to correct the frequency of the single sideband signal, but rather to correct the frequency of oscillator 26 to compensate for the frequency drift for the single sideband signal. If both switches 36 and 37 are closed, both oscillators 17 and 26 in cooperation with the phase control arrangement including phase detector 32 would cooperate in a compensation for frequency drift of the single sideband signal reducing the strain of this compensation upon any single one of the control components.

As in the arrangement of FIG. 1, it is preferable to have equal gain in signal channels 5 and 6. This is accomplished by the AGC detector 31 which is responsive to the amplitude of the demodulated pilot signal to produce the gain control signal which is passed through low pass filter 38 to remove any unwanted frequency components and leave only the D.C. control signal. This control signal is applied to some means disposed in source 1, in this instance, amplifiers 14 and 18, of channels 5 and 6 respectively, to control the gain in the signal channels to be substantially equal for the proper combining of the channel signals in combiner 10.

The arrangement in FIG. 2 illustrates that the AFC control need not be applied to both oscillators of a diversity combining arrangement and also that it is possible to have a single heterodyning receiver with the local oscillator thereof being controlled for the purposes of AFC control to bring about distortionless demodulation of the single sideband signal. The arrangement of FIG. 2 also demonstrates that the AFC control signal may be applied to the oscillator of the synchronous demodulator to bring about the desired AFC control and hence distortionless demodulation of the single sideband signal. The arrangement illustrated in FIG. 2 also demonstrates that the control voltage may be applied to both oscillators 17 and 26 to bring about the desired frequency adjustment for the distortionless demodulation.

Referring to FIG. 3, there is illustrated therein transceiver equipment utilizing the single sideband suppressed carrier receiver of this invention. It will be recognized that source 1 in the arrangement of FIG. 3 includes antenna 39 to receive signals from a distant transmitter for application to duplexer 40. The output of duplexer 40 is coupled to pre-selector filter 41, the output of which is coupled to duplexer 42 for application to the first converter 43. First converter 43 reduces the UHF signal to a subcarrier frequency range by means of balanced modulator 44 and oscillator 45. In the example of frequencies illustrated, converter 43 reduces the UHF signal having a 875.7 megacycle center frequency to a subfrequency range having a 29.3 megacycle center frequency. The output of balanced modulator 44 is coupled to duplexer 46 and, hence, to a filter amplifier 47 for application to an amplifier 48 prior to application to the second converter or synchronous detector 7 wherein the intelligence is recovered. Thus, at the output of source 1, the output of balanced modulator 26, there is present the demodulated single sideband signal and the demodulated pilot signal which is coupled to the utilization device 29. Also coupled to the output of source 1, the output of balanced modulator 26, is the filter 30 to select the demodulated pilot signal for application through amplifier 31 to phase detector 4 for comparison with the signal output of oscillator 2. Phase detector 4 produces a control signal in response to the reference signal and the demodulated pilot signal proportional to the frequency drift of the single sideband signal relative to the reference signal. This control signal can operate upon either oscillator 45 or oscillator 27 to position the received signal in the frequency spectrum precisely with respect to the frequency of the reference signal to permit synchronous demodulator 7 to recover the single sideband signal without distortion thereof. This is similar to the control signal connection shown with respect to oscillators 17 and 26 of FIG. 2. As depicted in the arrangement in the transceiver of FIG. 3, the control signal is coupled from phase detector 4 to oscillator 45 to control the frequency of the output signal therefrom for positioning the received sideband signal precisely with respect to the reference oscillator 2.

Utilizing the receiver arrangement following the principles of the single sideband receiver of this invention and the frequencies illustrated in the various curves and waveforms of the receiver of FIG. 3 or appropriately related frequencies, first converter 43 may be utilized as the "up" converter for the transmitter portion of the transceiver. Thus, the baseband signal from source 49 is operated upon by the first "up" converter 50 including balanced modulator 51 and oscillator 52 to produce a signal in a first frequency range for application to filter amplifier 53 whose output is coupled to duplexer 46 and, hence, to converter 43. The up conversion and, hence, the UHF signal for transmission is provided by selecting the sum of the two signals applied to the input of balanced modulator 44, duplexer 42 and RF amplifier 54 for application through duplexer 40 for transmission from antenna 40 to a distant receiver.

Thus, by utilizing frequency converter 43 as the down converter in the receiver portion of the transceiver and the "up" converter in the transmitter portion of the transceiver, a reduction of equipment is accomplished. The receiver responds to the difference of the signals applied to the input of the modulator 44 to produce the receiver signal for demodulation while the transmitter selects the sum of the signals applied to the modulator 44 to provide the transmitter frequency.

The frequencies illustrated in the arrangement of FIG. 3, as mentioned previously, are given by way of example only. The system as described has a restriction on frequency in that the transmitter and receiver frequencies must differ by approximately twice the IF frequency. The system of course can be extended to O/H, over-the-horizon, operation with no change in the arrangement illustrated or the basic concept employed in the system of FIG. 3. As mentioned previously, the balanced modulator 44 is used for both up and down conversion. Since the two UHF signals are approximately 60 megacycles apart, duplexers plus the selective networks, preselector 41 and RF amplifiers 54, makes possible the sharing of the UHF balanced modulator 44 and oscillator 45. As in the other two arrangements illustrated in FIGS. 1 and 2, the pilot signal is utilized to activate the AGC detector 32 to provide an AGC control signal for operation upon amplifier 48 to provide gain control in the receiving portion of the transceiver of FIG. 3.

While we have described above the principles of our invention in connection with specific apparatus, it is to be clearly understood that this description is made only by way of example and not as a limitation to the scope of our invention as set forth in the objects thereof and in the accompanying claims.

We claim:

1. A single sideband suppressed carrier receiver comprising an antenna to receive signals including a single sideband suprressed carrier signal and a pilot signal having a frequency related to the frequency of said suppressed carrier, a heterodyne means coupled to said antenna, a demodulator means coupled to said heterodyne means to demodulate said single sideband suppressed carrier signal and said pilot signal, a source of reference signal having a frequency substantially equal to the frequency of said demodulated pilot signal, means coupled to said demodulator means and said source of reference signal to compare said demodulated pilot signal and said reference signal and produce a control signal proportional to the frequency means to couple said control signal to at least one of said heterodyne means and said demodulator means to means coupled to said antenna responsive to said control signal to compensate said frequency drift for substantially distortionless demodulation of said single sideband signal.

2. A single sideband suppressed carrier receiver comprising an antenna to receive signals including a single sideband supressed carrier signal and a pilot signal having a frequency related to the frequency of said suppressed carrier, a mixer coupled to said antenna, a first oscillator coupled to said mixer to heterodyne the received signals, a single sideband demodulator including a second oscillator coupled to the output of said mixer to demodulate said single sideband signal and said pilot signal, a source of reference signal having a frequency substantially equal to the frequency of said demodulated pilot signal, means coupled to said demodulator and said source of reference signal to compare said demodulated pilot signal and said reference signal and produce a control signal proportional to the frequency drift of said single sideband signal with respect to said reference signal, and means to couple said control signal to at least one of said first and second oscillators to compensate said frequency drift for substantially distortionless demodulation of said single sideband signal.

3. A single sideband suppressed carrier receiver comprising an antenna to receive signals including a single sideband suppressed carrier signal and a pilot signal having a frequency related to the frequency of said suppressed carrier, a mixer coupled to said antenna, a first oscillator coupled to said mixer to heterodyne the received signals, a single sideband demodulator including a second oscillator coupled to the output of said mixer to demodulate said single sideband signal and said pilot signal, a source of reference signal having a frequency substantially equal to the frequency of said demodulated pilot signal, means coupled to said demodulator and said source of reference signal to compare said demodulated pilot signal and said reference signal and produce a control signal proportional to the frequency drift of said single sideband signal with respect to said reference signal, and means to couple said control signal to said first oscillator to compensate said frequency drift for substantially distortionless demodulation of said single sideband signal.

4. A single sideband suppressed carrier receiver comprising an antenna to receive signals including a single sideband suppressed carrier signal and a pilot signal having a frequency related to the frequency of said suppressed carrier, a mixer coupled to said antenna, a first oscillator coupled to said mixer to heterodyne the received signals, a single sideband demodulator including a second oscillator coupled to the output of said mixer to demodulate said single sideband signal and said pilot signal, a source of reference signal having a frequency substantially equal to the frequency of said demodulated pilot signal, means coupled to said demodulator and said source of reference signal to compare said demodulated pilot signal and said reference signal and produce a control signal proportional to the frequency drift of said single sideband signal with respect to said reference signal, and means to couple said control signal to said second oscillator to compensate said frequencey drift for substantially distortionless demodulation of said single sideband signal.

5. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a control signal proportional to the frequency drift of said combined single sideband signal with respect to said reference signal, and means to couple said control signal to at least one of said first and second oscillators to compensate said frequency drift for substantially distortionless demodulation of said combined single sideband signal.

6. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a control signal porportional to the frequency drift of said combined single sideband signal with respect to said reference signal, and means to couple said control signal to at least one of said first oscillators to compensate said frequency drift for substantially distortionless demodulation of said combined single sideband signal.

7. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a control signal proportional to the frequency drift of said combined single sideband signal with respect to said reference signal, and means to couple said control signal to both said first oscillators to compensate said frequency drift for substantially distortionless demodulation of said combined single sideband signal.

8. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a control signal proportional to the frequency drift of said combined single sideband signal with respect to said reference signal, and means to couple said control signal to said second oscillator to compensate said frequency drift for substantially distortionless demodulation of said combined single sideband signal.

9. A single sideband suppressed carrier receiver comprising an antenna to receive signals, including a single sideband suppressed carrier signal and a pilot signal having a frequency related to the frequency of said suppressed carrier, a heterodyne means coupled to said antenna, a gain control means coupled to the output of said heterodyne means, a demodulator means coupled to the output of said gain control means to demodulate said single sideband suppressed carrier signal and said pilot signal, a source of reference signal having a frequency substantially equal to the frequency of said demodulated pilot signal, means coupled to said demodulator means and said source of reference signal to compare said demodulated pilot signal and said reference signal and produce a first control signal proportional to the frequency drift of said single sideband signal with respect to said reference signal, means to couple said first control signal to at least one of said heterodyne means and said demodulator means to compensate said frequency drift for substantially distortionless demodulation of said single sideband signal, means coupled to said demodulator means responsive to said demodulated pilot signal to produce a second control signal, and means to couple said second control signal to said gain control means to control the amplitude of the signals coupled to said demodulator means.

10. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first and second oscillators to compensate said frequency drift for substantially distortionless demodulation of said combined single sideband signal, means responsive to said pilot signal to produce a second control signal, and means disposed in each of said signal channels responsive to said second control signal to control the amplitude of said channel signals.

11. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first and second oscillators to compensate said frequency drift for substantially distortionless demodulation of said combined single sideband signal, a phase comparing arrangement coupled to the output of each of said signal channels to produce a second control signal proportional to the phase difference between said channel signals, and means to couple said second control signal to at least one of said first oscillators to adjust said channel signals relative to each other to enable inphase combining of said channel signals in said combining means.

12. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first and second oscillators to compensate said frequency drift for substantially distortionless demodulation of said combined single sideband signal, a phase comparing arrangement coupled to the output of each of said signal channels to produce a second control signal proportional to the phase difference between said channel signals, and means to couple said second control signal to both of said first oscillators to differentially adjust said channed signals relative to each other to enable the inphase combining of said channel signals in said combining means.

13. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first oscillators to compensate said frequency drift for substantially distortionless demodulation of said combined single sideband signal, a phase comparing arrangement coupled to the output of each of said signal channels to produce a second control signal proportional to the phase difference between said channel signals, and means to couple said second control signal to at least one of said first oscillators to adjust said channel signals relative to each other to enable inphase combining of said channel signals in said combining means.

14. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first oscillators to compensate said frequency drift for substantially distortionless demodulation of said combined single sideband signal, a phase comparing arrangement coupled to the output of each of said signal channels to produce a second control signal proportional to the phase difference between said channel signals, and means to couple said second control signal to both said first oscillators to differentially adjust the said channel signals relative to each other to enable inphase combining of said channel signals in said means to combine.

15. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to both said first oscillators to compensate said frequency drift for substantially distortionless demodulation of said combined single sideband signal, a phase comparing arrangement coupled to the output of each of said signal channels to produce a second control signal proportional to the phase difference between said channel signals, and means to couple said second control signal to both of said first oscillators to differentially adjust said channel signals relative to each other to enable the inphase combining of said channel signals in said combining means.

16. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first and second oscillators to compensate said frequency drift for substantially distortionless demodulation of said combined single sideband signal, a phase comparing arrangement coupled to the output of each of said signal channels to produce a second control signal proportional to the phase difference between said channel signals, means to couple said second control signal to at least one of said first oscillators to adjust said channel signals relative to each other to enable inphase combining of said channel signals in said combining means, means responsive to said pilot signal to produce a third control signal, and means disposed in each of said signal channels responsive to said third control signal to control the gain of said signal channels equally.

17. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to at least one of said first oscillators to compensate said frequency drift for substantially distortionless demodulation of said combined single sideband signal, a phase comparing arrangement coupled to the output of each of said signal channels to produce a second control signal proportional to the phase difference between said channel signals, means to couple said second control signal to at least one of said first oscillators to adjust said channel signals relative to each other to enable inphase combining of said channel signals in said combining means, means responsive to said pilot signal to produce a third control signal, and means disposed in each of said signal channels responsive to said third control signal to control the gain of said signal channels equally.

18. A single sideband suppressed carrier diversity receiver comprising a plurality of signal channels each responsive to a channel signal including a single sideband suppressed carrier signal and a pilot signal having a frequency related to the frequency of said suppressed carrier, said channel signals having a random phase relationship with respect to each other, each of said signal channels including a mixer and first oscillator to translate the center frequency of said channel signal to a given common center frequency, means coupled to the output of each of said signal channels to combine said channel signals into one single sideband suppressed carrier signal, a demodulator including a second oscillator coupled to said combining means to demodulate said combined single sideband signal, a source of reference signal having a frequency substantially equal to the frequency of said pilot signal at the output of said demodulator, means coupled to said demodulator and said source of reference signal to produce a first control signal proportional to the frequency drift of said combined single sideband signal with respect to said reference signal, means to couple said first control signal to both said first oscillators to compensate said frequency drift for substantially distortionless demodulation of said combined single sideband signal, a phase comparing arrangement coupled to the output of each of said signal channels to produce a second control signal proportional to the phase difference between said channel signals, means to couple said second control signal to both of said first oscillators to differentially adjust said channel signals relative to each other to enable the inphase combining of said channel signals in said combining means, means responsive to said pilot signal to produce a third control signal, and means disposed in each of said signal channels responsive to said third control signal to control the gain of said signal channels equally.

19. A single sideband suppressed carrier transceiver comprising a balanced modulator, an oscillator coupled to said balanced modulator, a source of first signal coupled to said balanced modulator, said first signal including a first single sideband suppressed carrier signals and a pilot signal having a frequency related to the frequency of the suppressed carrier of said first single sideband signal, means coupled to said balanced modulator to transmit said first signal, means to receive a second signal, said second signal including a second single sideband suppressed carrier signal and a pilot signal having a frequency related to the frequency of the suppressed carrier of said second sideband signal, said first and second signals being in a predetermined relationship with respect to each other, means coupling said receiving means to said balanced modulator, means coupled to said balanced modulator to demodulate said second signal, a source of reference signal having a frequency substantially equal to said pilot signal of said second signal, means coupled to said demodulator means and said source of reference signal to produce a control signal proportional to the frequency drift of said second signal with respect to said reference signal, and means to couple said control signal to said oscillator to compensate said frequency drift for substantially distortionless demodulation of said second signal and distortionless transmission of said first signal.

20. A single sideband suppressed carrier transceiver comprising a balanced modulator, an oscillator coupled to said balanced modulator, a source of first signal coupled to said balanced modulator, said first signal including a first single sideband suppressed carrier signals and a pilot signal having a frequency related to the frequency of the suppressed carrier of said first single sideband signal, means coupled to said balanced modulator to transmit said first signal, means to receive a second signal, said second signal including a second single sideband suppressed carrier signal and a pilot signal having a frequency related to the frequency of the suppressed carrier of said second sideband signal, means coupling said receiving means to said balanced modulator, means coupled to said balanced modulator to demodulate said second signal, a source of reference signal having a frequency substantially equal to said pilot signal of said second signal, means coupled to said demodulator means and said source of reference signal to produce a first control signal proportional to the frequency drift of said second signal with respect to said reference signal, means to couple said first control signal to said oscillator to compensate said frequency drift for substantially distortionless demodulation of said second signal and distortionless transmission of said first signal, means coupled to said demodulator means responsive to said pilot signal of said second signal to produce a second control signal, and means disposed in said demodulator means responsive to said second control signal to control the amplitude of said second signal.

References Cited by the Examiner

UNITED STATES PATENTS

| | | | |
|---|---|---|---|
| 1,844,973 | 2/32 | Ports | 325—49 |
| 1,989,770 | 2/35 | Reeves | 325—329 X |
| 2,783,372 | 2/57 | Peterson et al. | 325—306 |
| 2,794,120 | 5/57 | Hansell et al. | 325—420 |
| 2,871,294 | 1/59 | Stachiewicz | 179—15.5 |
| 2,871,295 | 1/59 | Stachiewicz | 179—15.5 |
| 2,921,188 | 1/60 | Ringoen | 325—330 X |
| 2,951,152 | 8/60 | Sichak et al. | 325—305 |
| 2,976,411 | 3/61 | Kahn | 325—330 |
| 3,084,328 | 4/63 | Groeneveld et al. | 325—49 |

DAVID G. REDINBAUGH, *Primary Examiner.*

L. MILLER ANDRUS, *Examiner.*